Patented Oct. 26, 1926.

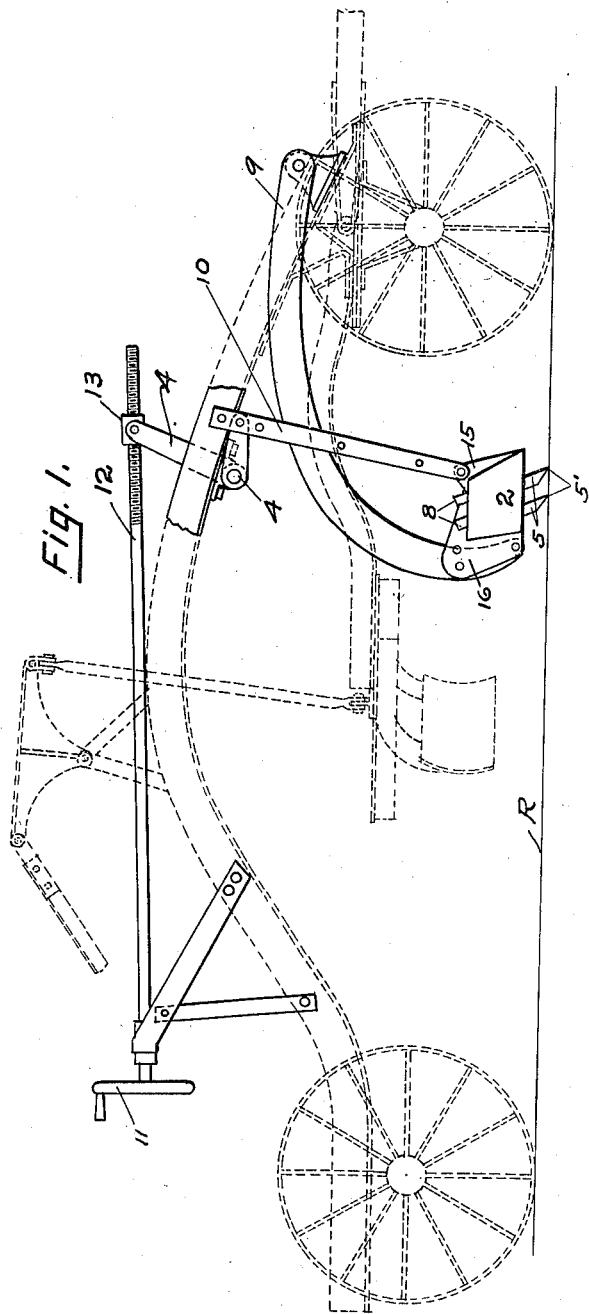

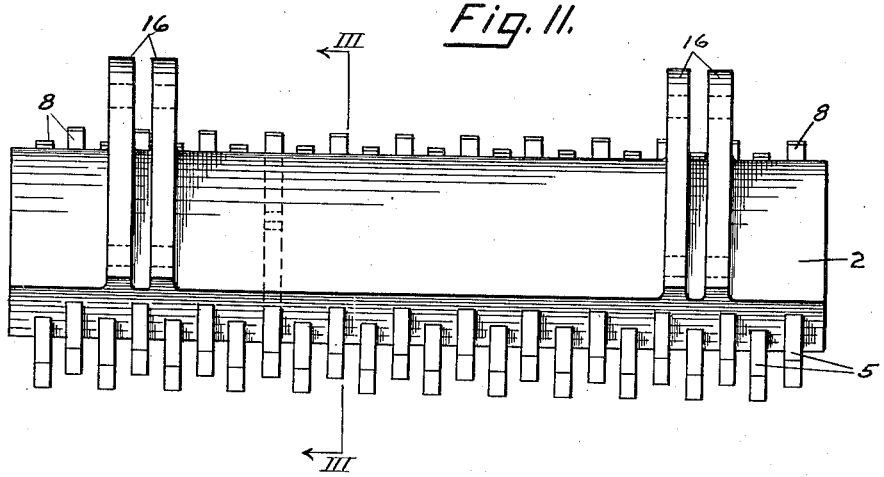
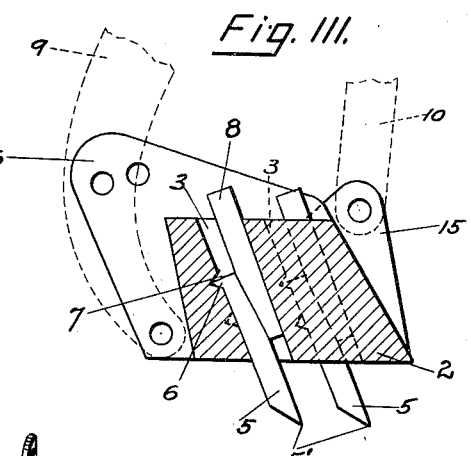
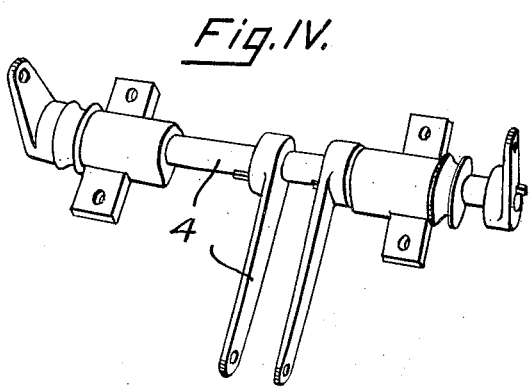

1,604,942

UNITED STATES PATENT OFFICE.

HANS W. IRELAND, OF PORTLAND, OREGON, ASSIGNOR TO J. L. LATTURE EQUIPMENT COMPANY, OF PORTLAND, OREGON, A CORPORATION OF OREGON.

SCARIFIER.

Application filed July 3, 1925. Serial No. 41,312.

My invention relates to road working machinery and particularly to machines adapted to the work of tearing up old roadbeds that have been graveled, macadamized or paved, and to prepare the surfaces thereof so that they can be leveled and the roads rebuilt.

I am aware that machines of this character are well known and widely used, but my invention describes a better construction than has heretofore been used and for that reason is an advance in the art.

The invention consists of the improved construction and the arrangement and combination of parts which will be hereinafter fully described and particularly pointed out in the claims hereunto annexed.

One of the principal purposes of my invention is to dispense with bolts, set screws and threaded devices of like character which in practice become rusted and immovable due to the fact that the machine is always used and commonly stored out of doors.

Another object of my invention, of major importance, is to permit inserting the teeth in a plurality of rows, the teeth in any row being in staggered relation to the teeth in any other row.

In the drawings herewith, which form a part of this specification, Fig. I shows a conventional road grading machine in outline with my new scarifier attached. Fig. II is a rear elevation of the beam member of my new scarifier with a plurality of scarifier teeth fixed therein in operative position but not attached to a road machine. Fig. III is a section at the line III—III, Fig. II. Fig. IV is a perspective view of the part indicated by numeral 4, Fig. I.

The beam member, 2, is preferably a one piece casting, having tooth pockets, 3, cored therein, though they may be machined if desired. The scarifier teeth, 5, are made of steel or other suitable material and have a working end, 5', adapted to engage the roadbed to be worked at one end and near the other end have a partial head or distortion formed integral with said tooth, 5, as shown at numeral 6, which is adapted to engage with the recess, 7, in the tooth pockets, 3, of the beam member, 2. A wedge member, 8, is adapted to engage the scarifier tooth, 5, as shown, and hold the partial head, 6, thereof in fixed position in the recess, 7, of the said beam member, 2, thereby preventing longitudinal motion of the said tooth, 5, until said wedge member, 8, is purposely removed. Lugs, 15 and 16, are shown to be made integral with the beam member, 2, for the purpose of attaching suitable supports, but may be attached with any suitable type of fastening if desired.

It will be observed by this construction that each tooth member, 5, is held securely in place by its own wedge member, 8, and does not depend upon any bolts, clamps or similar means such as have heretofore been employed. This construction likewise permits a much greater number of teeth to be inserted in the beam member, 2, than would be possible with any other construction and likewise permits the teeth to be set in rows in staggered relation to enable the teeth to cover the entire surface of the roadway upon which they are being used. Further, each tooth is held rigidly in place by its own means and may be removed or replaced without disturbing any of the other teeth.

Conventional means for attaching the scarifying device are shown diagrammatically by the draft beam, 9, the support lever, 10, the shaft or bell crank, 4, and the hand wheel, 11, which is attached to and adapted to turn the threaded shaft, 12, by means of the shaft nut, 13, thus permitting proper adjustment of the beam member, 2, and its contained teeth, 5, in proper relation to the road surface to be scarified as represented by the line R in Fig. I.

In the drawings I have shown a preferred embodiment of my invention but it will be apparent to anyone skilled in the art that tooth shapes may be varied in cross section from that shown and various other changes may be made without departing from the spirit of my invention.

What I claim as new and desire to secure by Letters Patent, is:

1. In a scarifier for a road machine, a one piece beam member having a plurality of rows of tooth pockets formed therein, the tooth pockets in any row being in staggered relation to the tooth pockets in any other row; recesses in said tooth pockets adapted to engage an enlarged portion of a scarifier tooth; a driven wedge driven into said tooth pocket whereby said enlarged portion of said scarifier tooth is held in fixed position by said driven wedge.

2. In a scarifier, a beam member having a plurality of rows of tooth pockets formed therein, the tooth pockets in any row being in staggered relation to the tooth pockets in any other row, driven wedges in combination with teeth of the character described for holding each tooth in fixed relation to the said beam member independently of any other tooth whereby any combination of teeth within the scope limited by the number of tooth pockets may be arranged and each tooth held independently by a driven wedge.

3. In a scarifier for a road machine, a beam member of the character described having a plurality of rows of tooth pockets formed therein of the character described and claimed, the tooth pockets in any row being in staggered relation to the tooth pockets in any other row, in combination with draft beam means for pulling said beam member, linkage means for holding said beam member in proper relation to a roadway, whereby the working end of scarifier teeth contained in said beam member may be adjusted in proper relation to the road surface to be scarified.

4. In a scarifier for a road machine, a one piece beam member of the character described cast from solid metal without joints and having formed therein a plurality of rows of tooth pockets, the tooth pockets in any row being in staggered relation to the tooth pockets in any other row.

HANS W. IRELAND.